(12) United States Patent
Kojokaro et al.

(10) Patent No.: US 8,064,516 B2
(45) Date of Patent: Nov. 22, 2011

(54) TEXT RECOGNITION DURING VIDEO COMPRESSION

(75) Inventors: Gideon Kojokaro, Ramat Hasharon (IL); David Drezner, Raanana (IL)

(73) Assignee: Broadcom Corporation, Irvine, CA (US)

( * ) Notice: Subject to any disclaimer, the term of this patent is extended or adjusted under 35 U.S.C. 154(b) by 1824 days.

(21) Appl. No.: 11/159,217

(22) Filed: Jun. 23, 2005

(65) Prior Publication Data

US 2006/0274833 A1 Dec. 7, 2006

Related U.S. Application Data

(60) Provisional application No. 60/686,416, filed on Jun. 2, 2005.

(51) Int. Cl.
*H04N 7/12* (2006.01)
*H04N 11/02* (2006.01)
*H04N 11/04* (2006.01)
*G06K 9/34* (2006.01)
*G06K 9/00* (2006.01)

(52) U.S. Cl. .................. 375/240.03; 382/164; 382/176; 382/251

(58) Field of Classification Search .................. 375/240
See application file for complete search history.

(56) References Cited

U.S. PATENT DOCUMENTS

| | | | | |
|---|---|---|---|---|
| 5,535,013 A * | 7/1996 | Murata | ......................... | 382/239 |
| 6,307,962 B1 * | 10/2001 | Parker et al. | .................. | 382/170 |
| 6,993,185 B2 * | 1/2006 | Guo et al. | ..................... | 382/176 |
| 7,339,992 B2 * | 3/2008 | Chang et al. | ............. | 375/240.25 |
| 2002/0181583 A1 * | 12/2002 | Corbera | .................... | 375/240.03 |
| 2005/0013500 A1 * | 1/2005 | Lee et al. | ....................... | 382/251 |
| 2006/0062454 A1 * | 3/2006 | Fan et al. | ...................... | 382/164 |

OTHER PUBLICATIONS

Jung et al., "Text Information Extraction in Image and Video: A Survey", The Journal of Pattern Recognition Society, 2004, pp. 978-997.*
Gargi et al., "A System for Automatic Text Detection Video", IEEE International Conference on Document Analysis and Recognition, 1999, pp. 20-22.*
Lienhart, "Automatic Text Recognition for Video Indexing", ACM Multimedia 96, pp. 11-21.*
Zhong at al., "Automatic Caption Localization in Compressed Video", III Trans. on Pattern Analysis and Machine Intelligence, vol. 22, No. 4, 2000.*
Crandall et al., "Extraction of Special Effects Caption Text Events from Digital Video", International Journal on Document Analysis and Recognition, 2003, vol. 5, pp. 138-157.*

* cited by examiner

*Primary Examiner* — Christopher S Kelley
*Assistant Examiner* — Hee-Yong Kim
(74) *Attorney, Agent, or Firm* — Sterne, Kessler, Goldstein & Fox PLLC

(57) ABSTRACT

A method for encoding an image of a video stream divided into macroblocks comprising determining a maximum of variance of luma blocks in a macroblock, determining if the maximum of variance exceeds a predetermined threshold, determining if the motion vectors of the macroblock are in correlation with a reference macroblock, determining if the macroblock is not an edge macroblock and setting a first quantization level for the macroblock if it meets these conditions and setting a second quantization level for the macroblock if it does not meet these conditions, where the second quantization level is greater than the first quantization level.

13 Claims, 7 Drawing Sheets

TEXT RECOGNITION DURING VIDEO COMPRESSION

CROSS-REFERENCE TO RELATED APPLICATION

This application claims the benefit of U.S. Provisional Application No. 60/686,416 filed Jun. 2, 2005, which is incorporated herein by reference.

FIELD OF THE INVENTION

This invention generally relates to video compression and more specifically to recognizing text and improving its quality during video compression.

BACKGROUND OF THE INVENTION

A visual information source requires a transmission or a storage medium to convey its message to the observer. The fidelity of transmission and reproduction of the message is closely related to and dependent on the available medium capacity and the manner in which it is used. In the digital world the medium capacity is expressed in bits per second or the bit rate. The transmission of visual information can be improved by compressing the video signal and transmitting the compressed signal. The goal of digital video compression is to represent an image with as low a bit rate as possible, while preserving an appropriate level of picture quality for a given application. Compression is achieved by identifying and removing redundancies.

A bit rate reduction system operates by removing redundant information from the signal at the encoder prior to transmission and re-inserting it at the decoder. An encoder and decoder pair are referred to as a 'codec'. In video signals, two distinct kinds of redundancy can be identified.

i. Spatial and temporal redundancy where pixel values are not independent, but are correlated with their neighbors both within the same frame and across frames. To some extent, the value of a pixel is predictable given the values of neighboring pixels.

ii. Psycho-visual redundancy where the human eye has a limited response to fine spatial detail and is less sensitive to detail near object edges or around shot-changes. Consequently, controlled impairments introduced into the decoded picture by the bit rate reduction process are not visible to a human observer.

At its most basic level, compression is performed when an input video stream is analyzed and information that is indiscernible to the viewer is discarded. Each event is then assigned a code where commonly occurring events are assigned fewer bits and rare events are assigned more bits. These steps are commonly referred to as signal analysis, quantization and variable length encoding. Common methods for compression include discrete cosine transform (DCT), vector quantization (VQ), fractal compression, and discrete wavelet transform (DWT).

A video stream can contain text, either as a logo, as subtitles or as a ticker moving across the screen. During compression, images comprising the video stream are quantized by an encoder to lower the bit rate of the video stream. Areas of an image containing text are quantized with the remaining portion of the image. While the reduction in quality of non-textual areas of the video may not be noticeable, lack of clarity in the text areas is noticeable making the text difficult to discern and in some cases render it unreadable.

What is needed is a method to encode a video stream while recognizing text and improving its quality.

BRIEF SUMMARY OF THE INVENTION

The invention comprises a method for encoding a video stream comprising images divided into macroblocks, where each macroblock includes luma and chroma blocks and each block is comprised of pixels. The method comprises determining a maximum of variance of luma blocks in a macroblock, determining if the maximum of variance exceeds a predetermined threshold, determining if the motion vectors of the macroblock are in correlation with a reference macroblock, determining if the macroblock is not an edge macroblock and setting a first quantization level for the macroblock if it meets these conditions and setting a second quantization level for the macroblock if it does not meet these conditions, where the second quantization level is greater than the first quantization level.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1:
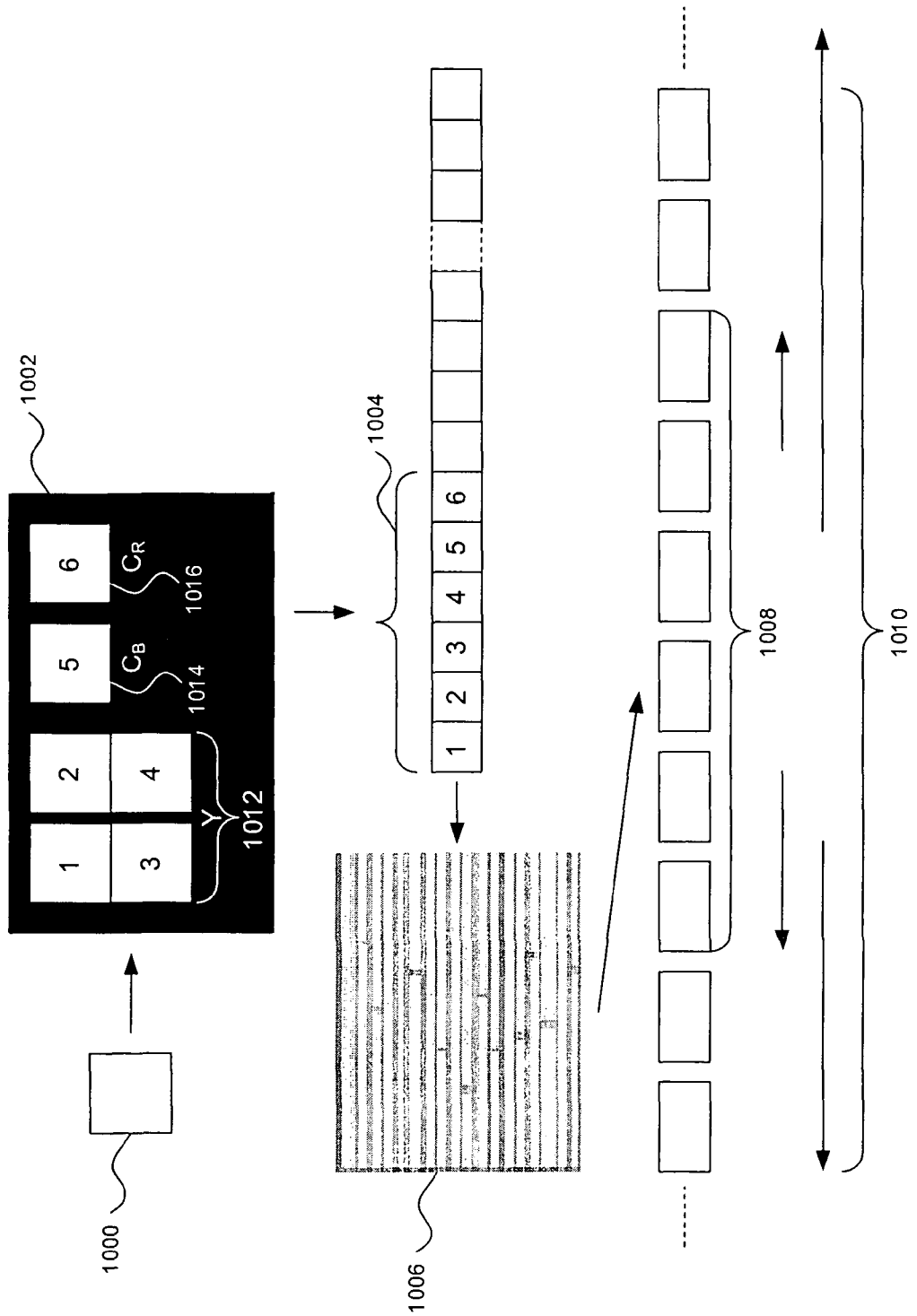
FIG. 1 illustrates an MPEG-2 video sequence.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

| TABLE OF CONTENTS | |
|---|---|
| I. Introduction | 4 |
| II. Video Compression | 5 |

-continued

| TABLE OF CONTENTS | |
|---|---|
| III. Compression Standards | 7 |
| IV. MPEG-2 Compression | 8 |
| IV. a) MPEG-2 data structure | 9 |
| IV. b) MPEG-2 Encoder | 11 |
| IV. c) MPEG-2 Decoder | 14 |
| V. Example Embodiments | 14 |
| VI. Conclusion | 23 |

I. INTRODUCTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention will be described in terms of an embodiment applicable to the recognition of text and the preservation or enhancement of quality of the recognized text during the process of encoding a video stream. It will be understood that the essential encoding concepts disclosed herein are applicable to a wide range of compression standards, codecs, electronic systems, architectures and hardware elements. Thus, although the invention will be disclosed and described in terms of recognizing and preserving or enhancing the quality of text in a compressed video stream, the invention is not limited to this field.

II. VIDEO COMPRESSION

Video compression techniques can be broadly categorized as lossless and lossy compression techniques. Most video compression techniques use a combination of lossless and lossy techniques to reduce the bit rate. These techniques can be used separately or they can be combined to design very efficient data reduction systems for video compression. Lossless data compression is a class of data compression algorithms that allow the original data to be reconstructed exactly from the compressed data. A lossy data compression method is one where compressing a file and then decompressing it produces a file that may be different from the original, but has sufficient information for its intended use. In addition to compression of video streams, lossy compression is used frequently on the internet and especially in streaming media and telephony applications. Some of the lossy and lossless compression techniques include but are not limited to:

a. Blanking removal: a technique in which the horizontal and vertical blanking areas of an image are not recorded or transmitted.
b. Discrete cosine transform (DCT): a lossy transform coding compression algorithm that samples an image at regular intervals, analyzes the frequency components present in the sample, and discards those frequencies which do not affect the image as the human eye perceives it.
c. Statistical Coding (or Entropy Coding): a technique that takes advantage of the statistical distribution of pixel values. Some data values can occur more frequently than others and therefore this method uses a coding technique that uses fewer bits for data values that occur more frequently.
d. Variable-length coding (VLC): also called Huffman coding or entropy coding is a compression technique that assigns fewer bits to code frequently occurring coefficient values and more bits to code infrequently occurring coefficient values.
e. Run-length coding (RLC): a compression technique that relies on the repetition of the same data sample value to generate special codes that indicate the start and end of a repeated value.
f. Truncation: a compression technique that reduces data by reducing the number of bits per pixel.
g. DPCM (Differential Pulse Code Modulation): a predictive compression technique that operates at the pixel level and sends only the difference between successive pixels.
h. Vector quantization (VQ): a lossy compression algorithm that analyzes an array of data instead of individual values. VQ algorithms compress redundant data while at the same time retaining the data stream's original intent.
i. Fractal compression: a form of vector quantization and is also a lossy compression algorithm. Compression is performed by locating self-similar sections of an image and then using a fractal algorithm to generate sections.
j. Discrete Wavelet Transform (DWT): a compression technique that mathematically transforms an image into frequency components.
k. Sample subsampling: an effective data reduction method which is applied to chrominance signals resulting in the 4:2:0 and 4:1:1 formats.
l. Requantizing: a process that assigns more bits to low frequency coefficient values and fewer bits to high frequency coefficient values thereby reducing the effective bit rate of a video stream.

Most compressions standards incorporate one of more of the above mentioned compression techniques to reduce the size of images and/or the bit rate of a video stream.

III. COMPRESSION STANDARDS

Image and video compression standards have been developed to facilitate easier transmission and/or storage of digital media and allow the digital media to be ported to discrete systems. Some of the most common compression standards include but are not limited to the following:

JPEG stands for Joint Photographic Experts Group. JPEG is a lossy compression technique used for full-color or gray-scale images, by exploiting the fact that the human eye will not notice small color changes. JPEG, like all compression algorithms, involves eliminating redundant data. JPEG, while designed for still images, is often applied to moving images, or video. JPEG 2000 provides an image coding system using compression techniques based on the use of wavelet technology.

MPEG (Moving Picture Experts Group) is the most common video compression standard. MPEG involves fully encoding only key frames through the JPEG algorithm and estimating the motion changes between these key frames. Since minimal information is sent between every four or five frames, there is a significant reduction in the bits required to describe the image. Consequently, compression ratios above 100:1 are common.

An MPEG encoder may make a prediction about an image and transform and encode the difference between the prediction and the image. The prediction accounts for movement within an image by using motion estimation. Because a given image's prediction may be based on future images as well as past ones, the encoder must reorder images to put reference images before the predicted ones. The decoder puts the images back into display sequence. It takes on the order of 1.1-1.5 billion operations per second for real-time MPEG encoding.

Currently there are five MPEG standards in use or in development. Each compression standard was designed with a specific application and bit rate in mind, although MPEG compression scales well with increased bit rates. The different MPEG standards are described below:
- a. MPEG-1 is designed for a 1.5 Mbit/sec standard for the compression of moving pictures and audio.
- b. MPEG-2 is designed for a 1.5 to 15 Mbit/sec standard on which Digital Television set top boxes and DVD compression are based. The process of MPEG-2 coding will be described in detail below with reference to an embodiment of the invention.
- c. MPEG-4 is a standard for multimedia and internet compression.
- d. MPEG-7 also known as Multimedia Content Description Interface is a standard that provides a framework for multimedia content that includes information on content manipulation, filtering and personalization, as well as the integrity and security of the content.
- e. MPEG-21 also known as the Multimedia Framework describes the elements needed to build an infrastructure for the delivery and consumption of multimedia content, and how they will relate to each other.

DV or Digital Video is a high-resolution digital video format used with video cameras and camcorders.

H.261 is a standard designed for two-way communication over ISDN lines (for video conferencing) and supports data rates which are multiples of 64 Kbit/s.

H.263 is based on H.261 with enhancements that improve video quality over modems.

DivX is a software application that uses the MPEG-4 standard to compress digital video, so it can be downloaded over the internet with no reduced visual quality.

IV. MPEG-2 COMPRESSION

The MPEG-2 codec uses a combination of lossless and lossy compression techniques to reduce the bit rate of a video stream. MPEG-2 is an extension of the MPEG-1 international standard for digital compression of audio and video signals. The most significant enhancement from MPEG-1 is its ability to efficiently compress interlaced video. MPEG-2 scales well to HDTV resolution and bit rates, obviating the need for an MPEG-3. MPEG-2 provides algorithmic tools for efficiently coding interlaced video, supports a wide range of bit rates and provides for multi-channel surround sound coding.

IV. a) MPEG-2 Data Structure

FIG. 1 illustrates the composition of a 4:2:0 MPEG-2 video sequence 1010. The MPEG-2 data structure is made up of six hierarchical layers. These layers are the block 1000, macroblock 1002, slice 1004, picture 1006, group of pictures (GOP) 1008 and the video sequence 1010.

Luminance and chrominance data of an image in the 4:2:0 format of a MPEG-2 video stream are separated into macroblocks that each consist of four luma (Y) blocks 1012 of 8×8 pixel values in a window of 16×16 pixels of the original picture and their associated color difference blue chroma ($C_B$) block 1014 and red chroma ($C_R$) block 1016. The number of chroma blocks in the macroblock depends on the sampling structure (e.g., 4:4:4, 4:2:2 or 4:2:0). Profile information in the sequence header selects one of the three chroma formats. In the 4:2:0 format as shown in FIG. 1, a macroblock consists of 4 Y blocks 1012, 1 $C_B$ block 1014 and 1 $C_R$ block 1016. In the 4:2:2 format a macroblock consists of 4 Y blocks, 2 $C_R$ blocks and 2 $C_B$ blocks.

In the 4:4:4 format a macroblock consists of 4 Y blocks, 4 $C_R$ blocks and 4 $C_B$ blocks.

The slice 1004 is made up of a number of contiguous macroblocks. The order of macroblocks within a slice 1004 is the same as that in a conventional television scan: from left to right and from top to bottom. The picture, image or frame 1006 is the primary coding unit in the video sequence 1010. The image 1006 consists of a group of slices 1004 that constitute the actual picture area. The image 1006 also contains information needed by the decoder such as the type of image (I, P or B) and the transmission order. Header values indicating the position of the macroblock 1002 within the image 1006 may be used to code each block. There are three image, picture or frame 1006 types in the MPEG-2 codec:
- a. 'Intra' pictures (I-pictures) are coded without reference to other pictures. Moderate compression is achieved by reducing spatial redundancy, but not temporal redundancy. They can be used periodically to provide access points in the bit stream where decoding can begin.
- b. 'Predictive' pictures (P-pictures) can use the previous I or P-picture for motion compensation and may be used as a reference for further prediction. Each block in a P-picture can either be predicted or intra-coded. By reducing spatial and temporal redundancy, P-pictures offer increased compression compared to I-pictures.
- c. 'Bidirectionally-predictive' pictures (B-pictures) can use the previous and next I or P-pictures for motion-compensation, and offer the highest degree of compression. Each block in a B-picture can be forward, backward or bidirectionally predicted or intra-coded. To enable backward prediction from a future frame, the coder reorders the pictures from their natural display order to a bit stream order so that the B-picture is transmitted after the previous and next pictures it references. This introduces a reordering delay dependent on the number of consecutive B-pictures.

The GOP 1008 is made up of a sequence of various combinations of I, P and B pictures. It usually starts with an I picture which provides the reference for following P and B pictures and identifies the point for switching and tape editing. GOPs 1008 typically contain 15 pictures, after which a new I picture starts a sequence of P and B pictures. Pictures are coded and decoded in a different order than they are displayed. This is due to the use of bidirectional prediction for B pictures.

Source order and encoder input order for a GOP 1008 may be:
I(1) B(2) B(3) P(4) B(5) B(6) P(7) B(8) B(9) P(10) B(11) B(12) I(13)

Encoding order and order in the coded bit stream for a GOP 1008 may be:
I(1) P(4) B(2) B(3) P(7) B(5) B(6) P(10) B(8) B(9) I(13) B(11) B(12)

Decoder output order and display order is the same as the encoder input order:
I(1) B(2) B(3) P(4) B(5) B(6) P(7) B(8) B(9) P(10) B(11) B(12) I(13)

The video sequence 1010 includes a sequence header, one or more GOPs 1008, and an end-of-sequence code. The header contains information about the picture. The video sequence 1010 is also known as the video elementary stream.

IV. b) MPEG-2 Encoder

Figure 2:
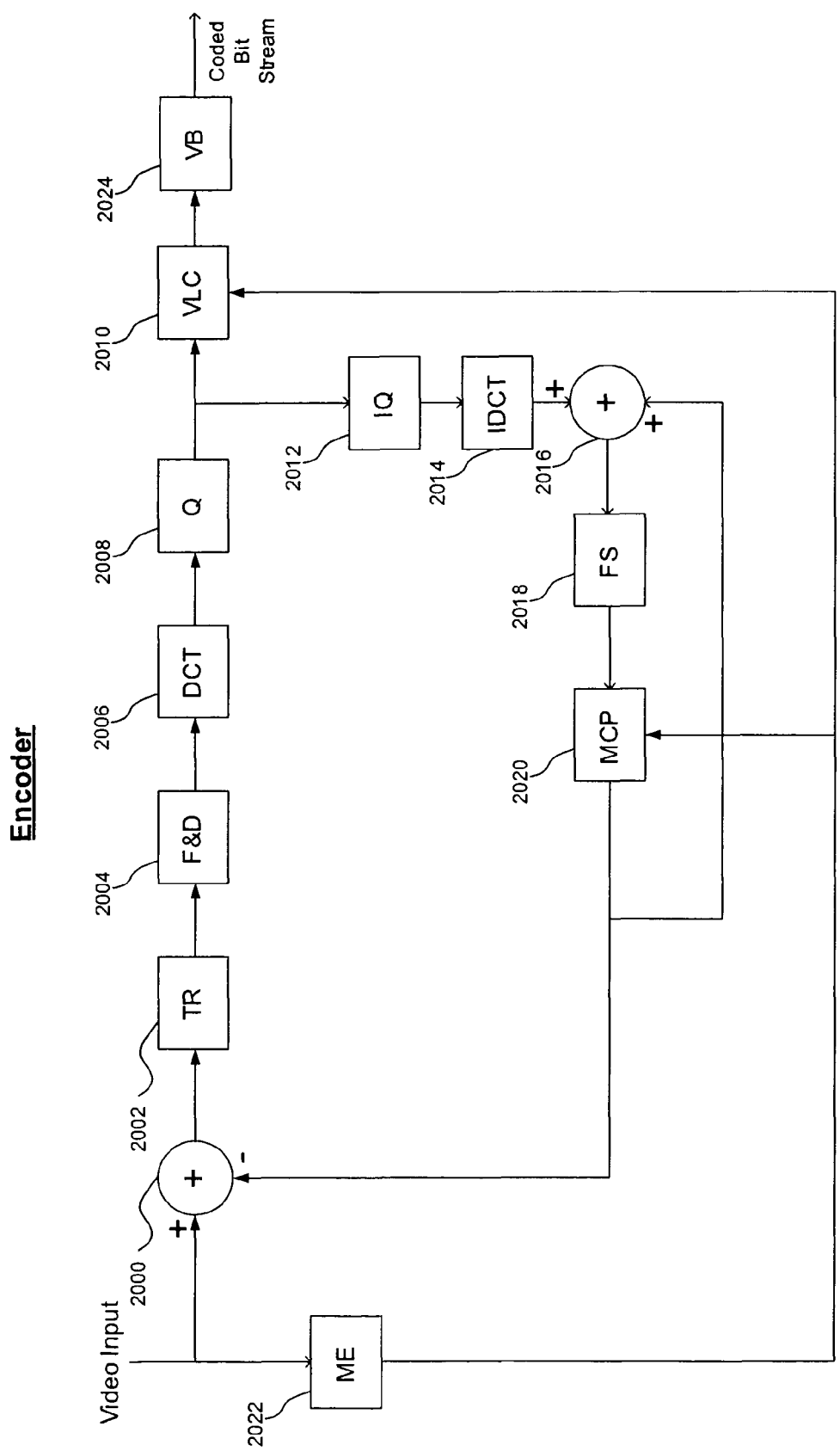
FIG. 2 is a block diagram of an example MPEG-2 encoder.

FIG. 2 is a block diagram of an example MPEG-2 encoder that has text recognition. The example MPEG-2 encoder includes a subtractor 2000, a text recognition unit 2002, a fill and delete unit 2004, a DCT unit 2006, a quantizer unit 2008, a variable length coder 2010, an inverse quantizer unit 2012, an inverse DCT unit 2014, an adder 2016, a frame storage unit 2018, a motion compensation predictor 2020, a motion estimator 2022 and a video buffer 2024.

The function of the encoder is to transmit a discrete cosine transformed macroblock from the DCT unit 2006 to the decoder, in a bit rate efficient manner, so that the decoder can perform the inverse transform to reconstruct the image. The numerical precision of the DCT coefficients may be reduced while still maintaining good image quality at the decoder. This is done by the quantizer 2008. The quantizer 2008 is used to reduce the number of possible values to be transmitted thereby reducing the required number of bits. The 'quantizer level', 'quantization level' or 'degree of quantization' determines the number of bits assigned to a DCT coefficient of a macroblock. The quantization level applied to each coefficient is weighted according to the visibility of the resulting quantization noise to a human observer. This results in the high-frequency coefficients being more coarsely quantized than the low-frequency coefficients. The quantization noise introduced by the encoder is not reversible in the decoder, making the coding and decoding process lossy.

Macroblocks of an image to be encoded are fed to both the subtractor 2000 and the motion estimator 2022. The motion estimator 2022 compares each of these new macroblocks with macroblocks in a previously stored reference picture or pictures. The motion estimator 2022 finds the macroblock in a reference picture that most closely matches the new macroblock. The motion estimator 2022 then calculates a 'motion vector' which represents the horizontal and vertical displacement from the macroblock being encoded to the matching macroblock-sized area in the reference picture. The horizontal displacement is estimated by an 'x motion vector' and the vertical displacement is estimated by a 'y motion vector'. The motion estimator also reads this matching macroblock (known as a 'predicted macroblock') out of a reference picture memory and sends it to the subtractor 2000 which subtracts it, on a pixel by pixel basis, from the new macroblock entering the encoder. This forms an 'error prediction' or 'residual signal' that represents the difference between the predicted macroblock and the current macroblock being encoded. Error prediction is the difference between the information being coded and a predicted reference or the difference between a current block of pixels and a motion compensated block from a preceding or following decoded picture.

The text recognition unit 2002 is used to identify and tag macroblocks containing text as 'text macroblocks'. The fill and delete unit 2004 is used to lower the quantizer level for macroblocks tagged as text macroblocks by the text recognition unit. The fill and delete unit 2004 is also an optimizer that identifies text macroblocks that were missed by the text recognition unit 2002 and macroblocks that were erroneously tagged as text macroblocks by the text recognition unit 2002. The fill and delete unit 2004 sets the quantization level for a macroblock after it determines if the macroblock was correctly tagged or was incorrectly skipped by the text recognition unit 2002. The steps taken by the text recognition unit 2002 and the fill and delete unit 2004 according to an embodiment of the invention are described in detail below.

The macroblock processed by the fill and delete unit 2004 is transformed from the spatial domain by the DCT unit 2006 to produce DCT coefficients. The DCT coefficients of the residual are then quantized by the quantizer unit 2008 that reduces the number of bits needed to represent each coefficient. Usually most coefficients are effectively quantized to 0.

The higher the quantizer level for a macroblock, the fewer bits are given to that macroblock and the visual quality of that macroblock is reduced. By lowering the quantizer level for a macroblock more bits are given to that macroblock and this improves its visual quality. The quantization level for macroblocks that are identified as text macroblocks is lowered by a predetermined level by the fill and delete unit 2004 after optimization, thereby causing the quantizer unit 2008 to assign more bits to text macroblocks as compared to other macroblocks. Thus according to the current embodiment of the invention, text macroblocks have better visual quality compared to other macroblocks even after quantization.

The quantized DCT coefficients from the quantizer unit 2008 are coded by the VLC 2010 which further reduces the average number of bits per coefficient. The result from the VLC 2010 is combined with motion vector data and side information (including an indication of whether it's an I, P or B picture) and buffered in video buffer 2024. Side information is used to specify coding parameters and is therefore sent in smaller quantities than the main error prediction signal. Variations in coding methods may include trade-offs between the amount of this side information and the amount needed for the error prediction signal. For example, the use of three types of encoded pictures in MPEG-2 allows a certain reduction in the amount of error prediction information, but this must be supplemented by side information identifying the type of each picture.

For the case of P pictures, the quantized DCT coefficients also go through an internal loop that represents the operation of the decoder (a decoder within the encoder). The residual is inverse quantized by the inverse quantizer unit 2012 and inverse DCT transformed by the inverse DCT unit 2014. The predicted macroblock read out of the frame storage unit 2018 (which acts as a reference picture memory) is processed by the motion compensation predictor 2020 and added back to the residual obtained from the inverse DCT unit 2014 by adder 2016 on a pixel by pixel basis and stored back into frame storage unit 2018 to serve as a reference for predicting subsequent pictures. The object is to have the reference picture data in the frame storage unit 2018 of the encoder match the reference picture memory data in the frame storage unit 3010 of the decoder. B pictures are not stored as reference pictures.

The encoding of I pictures uses the same circuit, however no motion estimation occurs and the negative input to the subtractor 2000 is forced to 0. In this case the quantized DCT coefficients represent transformed pixel values rather than residual values as was the case for P and B pictures. As is the case for P pictures, decoded I pictures are stored as reference pictures in the frame storage unit 2018.

For many applications, the bit stream from the VLC 2010 must be carried in a fixed bit rate channel. In these cases, the video buffer 2024 is placed between the VLC 2010 and the channel. The video buffer 2024 is filled at a variable rate by the VLC 2010 and produces a coded bit stream at a constant rate as its output.

IV. c) MPEG-2 Decoder

Figure 3:
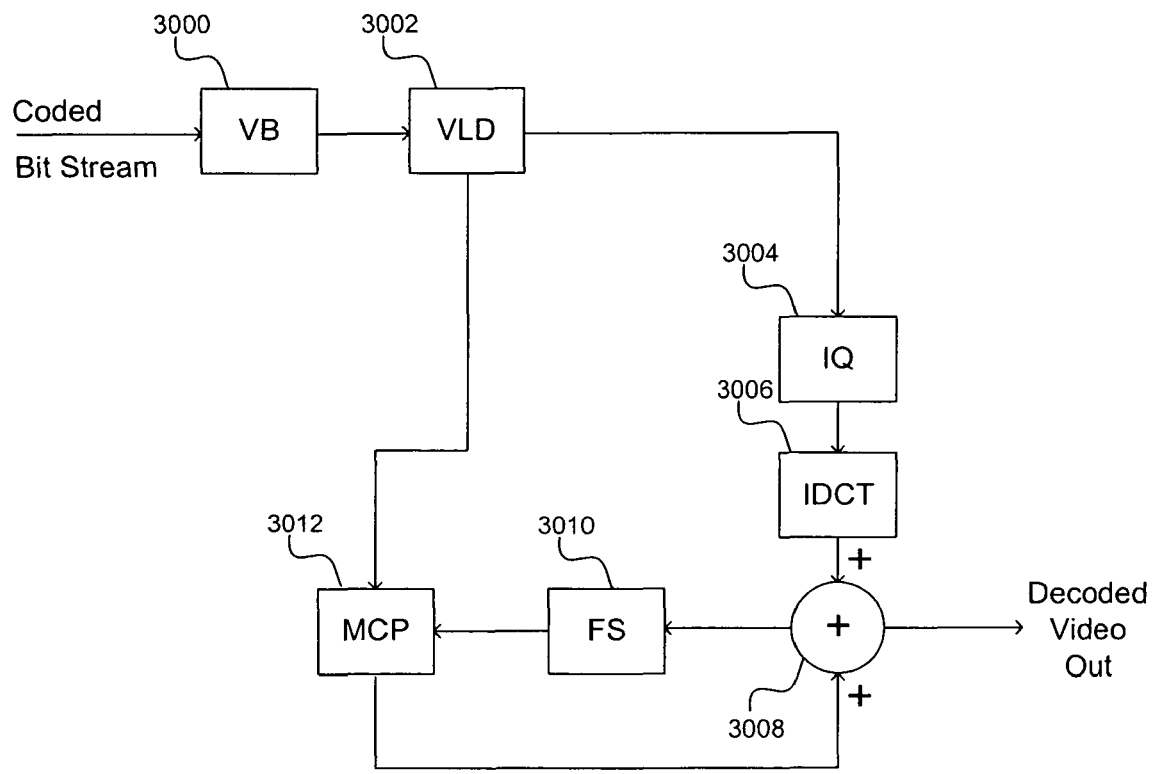
FIG. 3 is a block diagram of an example MPEG-2 decoder.

FIG. 3 is a block diagram of an example MPEG-2 decoder. The decoder includes a video buffer 3000, a variable length decoder (VLD) 3002, an inverse quantizer unit 3004, an inverse DCT unit 3006, an adder 3008, a frame storage unit 3010 and a motion compensation unit 3012.

The decoding process is the reverse of the encoding process. The coded bit stream received by the decoder is buffered by the video buffer 3000 and variable length decoded by the VLD 3002. Motion vectors are parsed from the data stream and fed to the motion compensation unit 3012. Quantized DCT coefficients are fed to the inverse quantizer unit 3004 and then to the inverse DCT unit 3006 that transforms them back to the spatial domain. For P and B pictures, motion vector data is translated to a memory address by the motion compensation unit 3012 to read a particular macroblock (a predicted macroblock) out of a reference picture previously stored in frame storage unit 3010. The adder 3008 adds this prediction to the residual to form reconstructed picture data. For I pictures, there are no motion vectors and no reference pictures, so the prediction is forced to zero. For I and P pictures, the adder 3008 output is fed back to be stored as a reference picture in the frame storage unit 3010 for future predictions.

V. EXAMPLE EMBODIMENTS

Using a high quantization level for text macroblocks of an image results in loss of visual quality of the text areas of the image which might make the text difficult to discern and in some cases even illegible. Text macroblocks have 'high activity' which is characterized by a high variance of their luma blocks. A text macroblock can be identified by comparing the maximum of variance of its luma blocks to a predetermined threshold. Also, text regions in videos such as a ticker moving across the screen, sub-titles or logos usually exhibit no vertical movement. These characteristics can be used to identify macroblocks containing text. Macroblocks identified as text macroblocks will have their quantization level lowered, thereby assigning them more bits during quantization and higher fidelity after decoding.

In an example embodiment, the text recognition unit 2002 and fill and delete unit 2004 are used in the MPEG-2 environment as shown in FIG. 2. When the MPEG-2 encoder receives the image macroblocks it already knows the type of picture it is going to encode since the encoder uses a constant image sequence (IBBPBBPBBP . . . ). B pictures are constructed from I and P pictures and hence they are not processed by the text recognition unit 2002 and the fill and delete unit 2004. In the current embodiment, the text recognition 2002 and fill and delete units 2004 are used only for reference pictures, i.e. I-pictures and P-pictures. This is because maintaining the quality of text areas in reference pictures maintains, as a by product, the quality of text areas in B-pictures as well without the need to utilize additional processor resources. This greatly reduces the amount of work that has to be done by the encoder. In other embodiments the text recognition unit 2002 and fill and delete unit 2004 can be used on either of I, P or B pictures or any combination thereof.

In the current embodiment, if a macroblock received by the text recognition unit is not a B picture macroblock, then the maximum of the variance of the luma blocks in that macroblock is calculated. The variance of each luma block is given by Variance of a block=(mean($x*x$)−mean($x$)*mean($x$))

where, x is luma intensity value of one pixel in a luma block,

Mean(x) is the average luma intensity of all pixels in a luma block,

Mean(x*x) is the average of the squares of intensity values of the pixels in the luma block, Activity of the macroblock=max (variance of all luma blocks in the macroblock).

If the maximum of variance of luma blocks in the macroblock is under a predetermined threshold (for example a threshold of 1500 might be used) the macroblock is not considered to be a text macroblock. If the maximum of variance of luma blocks of a macroblock is above a predetermined threshold, then if the macroblock belongs to an I-picture or if it has no motion vectors it is tagged as a text macroblock. If the maximum of variance of luma blocks of a macroblock is greater than a predetermined threshold and if the macroblock belongs to a P-picture (which has motion vectors), then the macroblock's motion vectors are correlated with the motion vectors of at least one reference macroblock. The current embodiment correlates only P-picture macroblocks, however other embodiments may correlate B-picture macroblocks or a combination of P and B picture macroblocks.

Motion vector correlation=*abs*(current macroblock's motion vector−reference macroblock's motion vector)

In the current embodiment a macroblock is in correlation with a reference macroblock if its x motion vector correlation is less than or equal to a predetermined threshold (for example a threshold of one pixel). The y motion vector of a macroblock is in correlation with the y motion vector of a reference macroblock if the difference between them is 0, i.e., there is no relative vertical movement between the current macroblock and the reference macroblock. Other embodiments can allow for small deviations in y motion vector correlation. If the current macroblock and the reference macroblock are in correlation (i.e. their x and y motion vectors are in correlation) then, the current macroblock is tagged as a text macroblock.

In the current embodiment the reference macroblock used for correlation can either be the previous or the next macroblock. In other embodiments, the reference macroblock can either be above, below, before or after the current macroblock or any combination thereof. In the current embodiment the correlation is determined using only one reference macroblock. In other embodiments correlation may be determined using multiple reference macroblocks. For example, macroblocks below and before the current macroblock or macroblocks above and below the current macroblock can be used as reference macroblock(s).

In the current embodiment, the macroblock must not be an "edge macroblock" to be tagged as a text macroblock. Edge macroblocks are at the boundaries of the picture i.e. at the four edges of the picture. In other embodiments, the macroblock's position within the image may not be used to determine if the macroblock should be tagged as a text macroblock if the macroblock meets the other criteria.

In the example embodiment presented in FIG. 2, the text recognition unit 2002 and the fill and delete unit 2004 are used to identify text macroblocks, optimize results and set a lower quantization level for text macroblocks before they are processed by the quantizer unit 2008. In other embodiments or in compression methods other than MPEG-2, the text recognition unit 2002 and the fill and delete unit 2004 can be substituted in other stages of the compression or decompression process as required.

Figure 4:
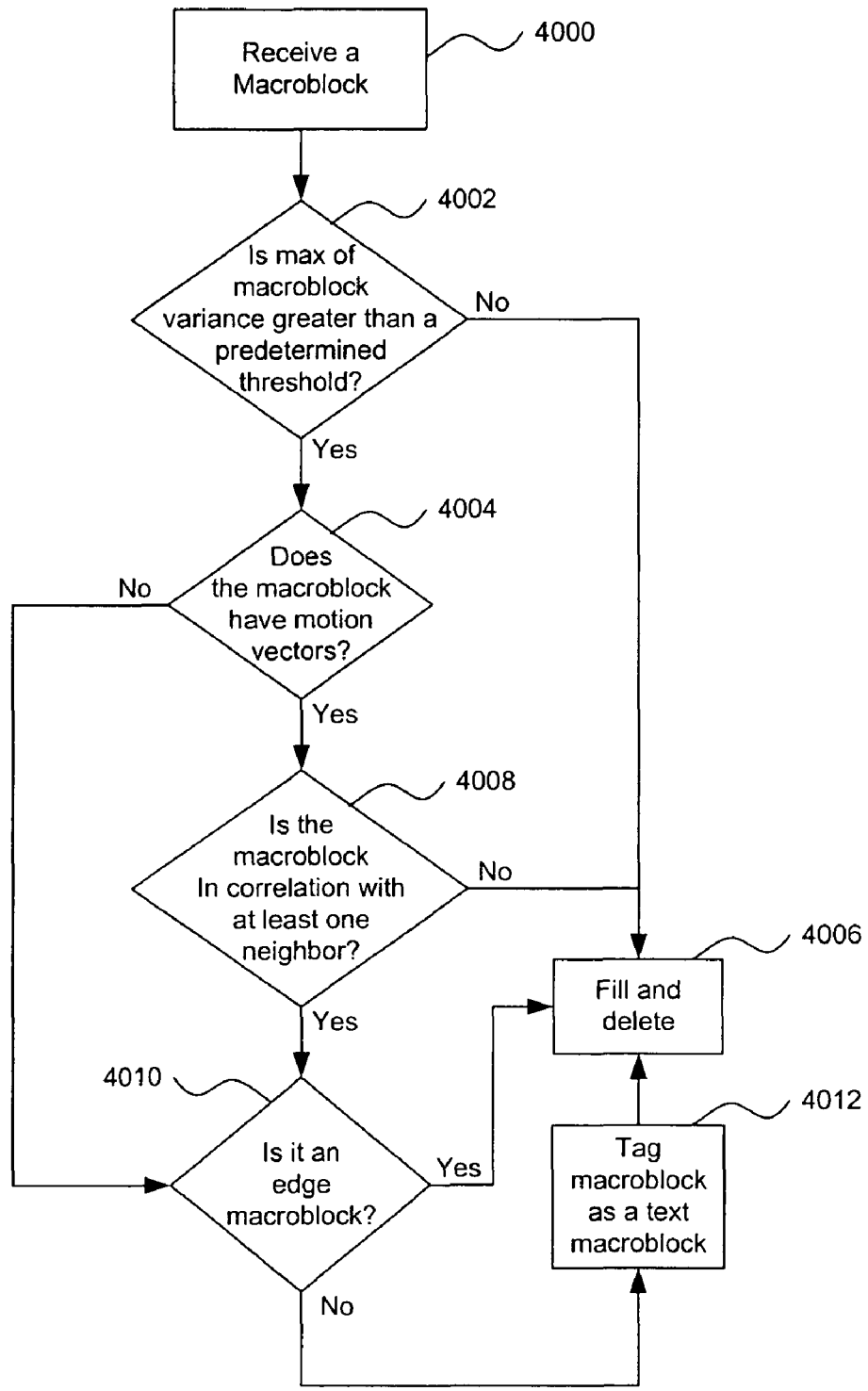
FIG. 4 is an exemplary flowchart showing steps taken by the text recognition unit according to an embodiment of the invention.

FIG. 4 is a flowchart of an embodiment of the invention showing steps performed by the text recognition unit 2002 to identify and tag text macroblocks. The text recognition unit 2002 receives a macroblock in step 4000 which will be referred to as the 'current macroblock'. Next, in step 4002. the text recognition unit 2002 calculates the maximum of the variances of the luma blocks of the current macroblock and if it is greater than a predetermined threshold. If the maximum of the variances of luma blocks of the current macroblock is less than a predetermined threshold, the macroblock is passed to the fill and delete unit 2004 in step 4006. If the maximum of the variances of luma blocks of the current macroblock is greater than a predetermined threshold, then the macroblock is passed to step 4004 where the text recognition unit 2002 determines if the current macroblock has motion vectors. If the current macroblock does not have motion vectors then in step 4010 the text recognition unit 2002 determines if the current macroblock is an edge macroblock. If the current macroblock does have motion vectors then in step 4008 the text recognition unit 2002 determines if the motion vectors of the current macroblock are in correlation with those of a reference macroblock. If there is correlation between the motion vectors of the current macroblock and the reference macroblock then in step 4010 the text recognition unit 2002 determines if the current macroblock is an edge macroblock. If the current macroblock is not an edge macroblock then it is tagged as a text macroblock in step 4012 and is transferred to the fill and delete unit in step 4006.

Figure 5:
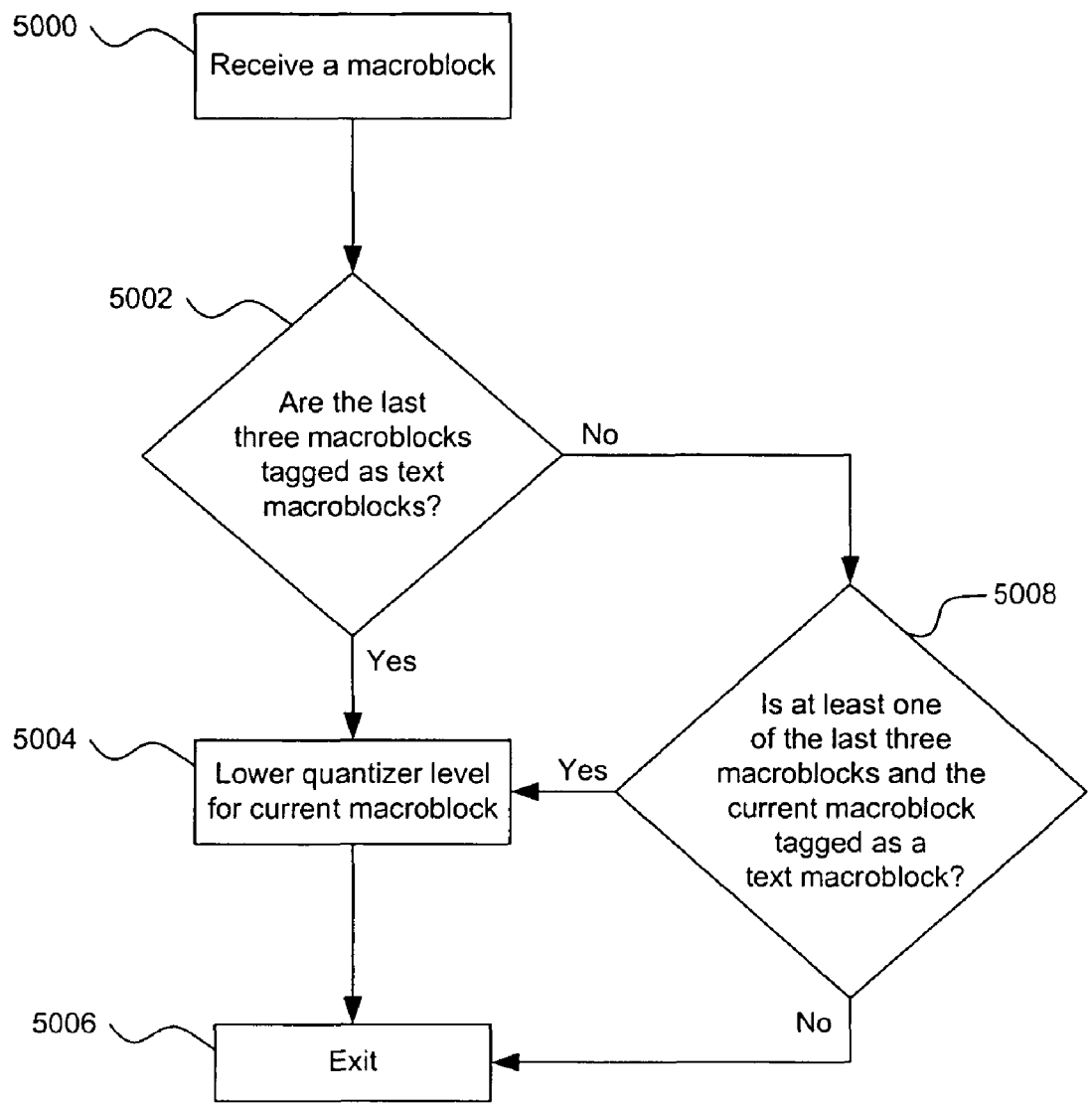
FIG. 5 is an exemplary flowchart showing the steps taken by the fill and delete unit according to an embodiment of the invention.

FIG. 5 is a flowchart of an embodiment of the invention showing steps taken by the fill and delete unit 2004 to lower the quantizer level for macroblocks containing text that were missed by the text recognition unit 2002 and to not lower the quantizer level for macroblocks that were erroneously tagged by the text recognition unit 2002 as text macroblocks. In step 5000, the fill and delete unit 2004 receives a macroblock from the text recognition unit 2002. In step 5002 the fill and delete unit 2004 determines if the last three macroblocks were tagged as text macroblocks. If the last three macroblocks were tagged as text macroblocks then the quantizer level for the current macroblock is lowered in step 5004. If the last three macroblocks were not tagged as text macroblocks then the fill and delete unit 2004 determines if at least one of the last three macroblocks and the current macroblock were tagged as a text macroblocks in step 5008. If at least one of the last three macroblocks and the current macroblock were tagged as text macroblocks then the quantizer level is lowered for the current macroblock in step 5004. If at least one of the last three macroblocks and the current macroblock were not tagged as text macroblocks then the quantizer level for the current macroblock is not lowered and the current macroblock is passed on to the next encoding stage in step 5006.

In the current embodiment, the fill and delete unit 2004 checks the last three macroblocks and the current macroblock to see if they were tagged as text macroblocks. In another embodiment, it would be obvious to a person skilled in the relevant art(s) to either check a different number of reference macroblocks or reference macroblocks in different positions relative to the current macroblock.

In other embodiments, the text recognition unit 2002 can be used alone or in conjunction with the fill and delete unit 2004. In such embodiments, the text recognition unit 2002 will simply lower the quantization level for text macroblocks without the optimization performed by the fill and delete unit 2004.

In other embodiments, the text recognition unit 2002 and fill and delete unit 2004 might be used on the decoder side. After an image has been processed by the text recognition 2002 and fill and delete 2004 units, the text areas can be enhanced by inverse quantizing the identified text regions to a greater level.

In yet another embodiment, the identified text regions can undergo edge enhancement and/or optical character recognition or a combination of these and other methods used to enhance text in images.

Figure 6:
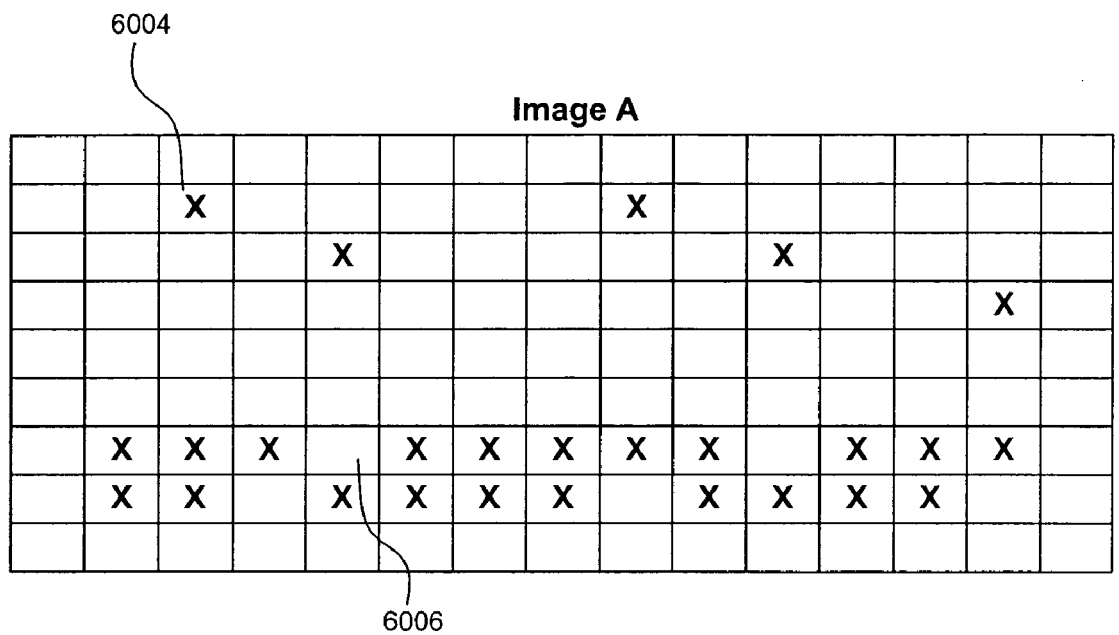
FIG. 6 illustrates example images processed by the text recognition unit and the fill and delete unit.
Figure 6:
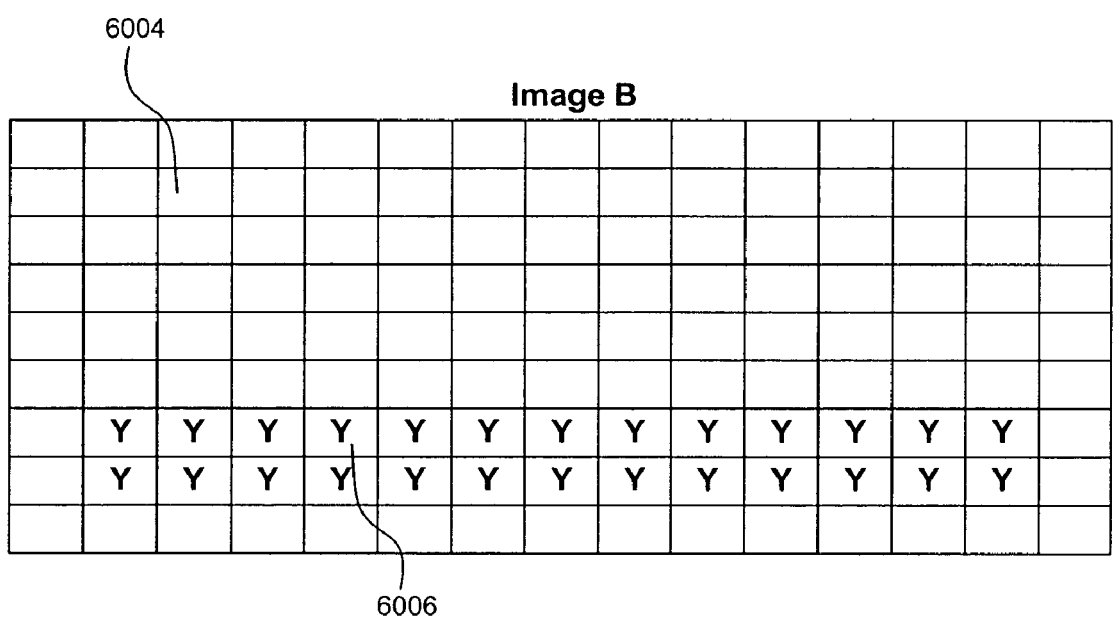

FIG. 6 shows an image A that has been processed by the text recognition unit 2002 and an image B that is the result after image A has been processed by the fill and delete unit 2004. Image A and B contain text in the lower portion of the image which might be subtitles or a ticker moving across the screen. Each box in images A and B represents a macroblock. In image A, each box with an X in it represents a macroblock that was tagged as a text macroblock by the text recognition unit 2002. In image B, each box with a Y in it represents a macroblock whose quantizer level was lowered by the fill and delete unit 2004. As seen in image A, some of the macroblocks detected by the text recognition unit 2002 as text macroblocks are randomly scattered such as macroblock. This occurs because some macroblocks (such as noisy macroblocks) might exhibit the same characteristics as a text macroblock such as a high variance and/or correlation of motion vectors with reference macroblocks. Also, in image A, some text macroblocks (such as macroblock 6006) were not tagged by the text recognition unit 2002. Such macroblocks are usually the spaces between text regions or regions containing only small portions of text that were not recognized by the text recognition unit 2002. The fill and delete unit 2004 is used to lower the quantizer level by a predetermined threshold for macroblocks that were correctly tagged as text macroblocks as well as those that were missed by the text recognition unit and to not lower the quantizer level for macroblocks that were erroneously tagged as text macroblocks (such as macroblock 6004). Image B shows that the macroblocks missed by the text recognition unit 2002, such as macroblock 6006, have been identified by the fill and delete unit 2004 and their quantizer level has been lowered in image B and the randomly scattered and erroneously tagged text macroblocks such as macroblock 6004 in image A do not have a lowered quantizer level in image B.

In the embodiments presented herein, the text recognition unit 2002 is used to recognize text by using characteristics associated with text in images and the fill and delete unit 2004 is used to optimize and set the quantization level for text macroblocks. In other embodiments, modules similar to the text recognition unit 2002 can be used to identify other features in an image such as specific shapes, colors or patterns. Therefore, in other embodiments, the text recognition unit 2002 can be substituted by a shape recognition unit, a color recognition unit, a pattern recognition unit or a combination of these and other characteristic recognition modules. Once these units recognize and tag a region which exhibits the desired characteristic(s), the fill and delete unit 2004 may be used to optimize for that characteristic(s) and adjust the quantizer level as desired. In some embodiments the fill and delete unit 2004 might not be used and the quantizer level might be adjusted by the specific character recognition module.

In the example embodiments an image 1006 is in a 4:2:0 MPEG-2 format with a macroblock 1002 consisting of four blocks of 8×8 Y values 1012 in a window of 16×16 pixels of the original picture and their associated $C_B$ 1014 and $C_R$ 1016 values. The number of chroma blocks in the macroblock depends on the sampling structure (4:4:4, 4:2:2 or 4:2:0). It is apparent to a person skilled in the relevant art(s) that the number of blocks and the terms block and macroblock are only presented as examples and that the embodiments are applicable to any image format that can be processed by the text recognition unit 2002 and the fill and delete unit 2004. The number of pixels in a block and the number of blocks in a macroblock are also arbitrary and can vary in different embodiments of the invention.

Unlike the MPEG-2 format, some encoding formats may not use motion vectors. However, since the variance of a luma region can be calculated for any picture regardless of the method of compression or coding, the embodiments presented herein are applicable to other video compression and video encoding formats.

The example embodiments presented are described in relation to video compression. The invention however, is not limited to these example embodiments, coding standards or video compression. Based on the description herein, a person skilled in the relevant art(s) will understand that the invention can be applied to other applications and a wide variety of image/video standards and compression formats.

As used herein, the terms "image", "picture", "frame" and the plural form of these terms are used interchangeably throughout this document and are used to denote individual images that comprise a video stream as is apparent to a person skilled in the relevant art(s).

The present invention, or portions thereof, can be implemented in hardware, firmware, software, and/or combinations thereof.

Figure 7:
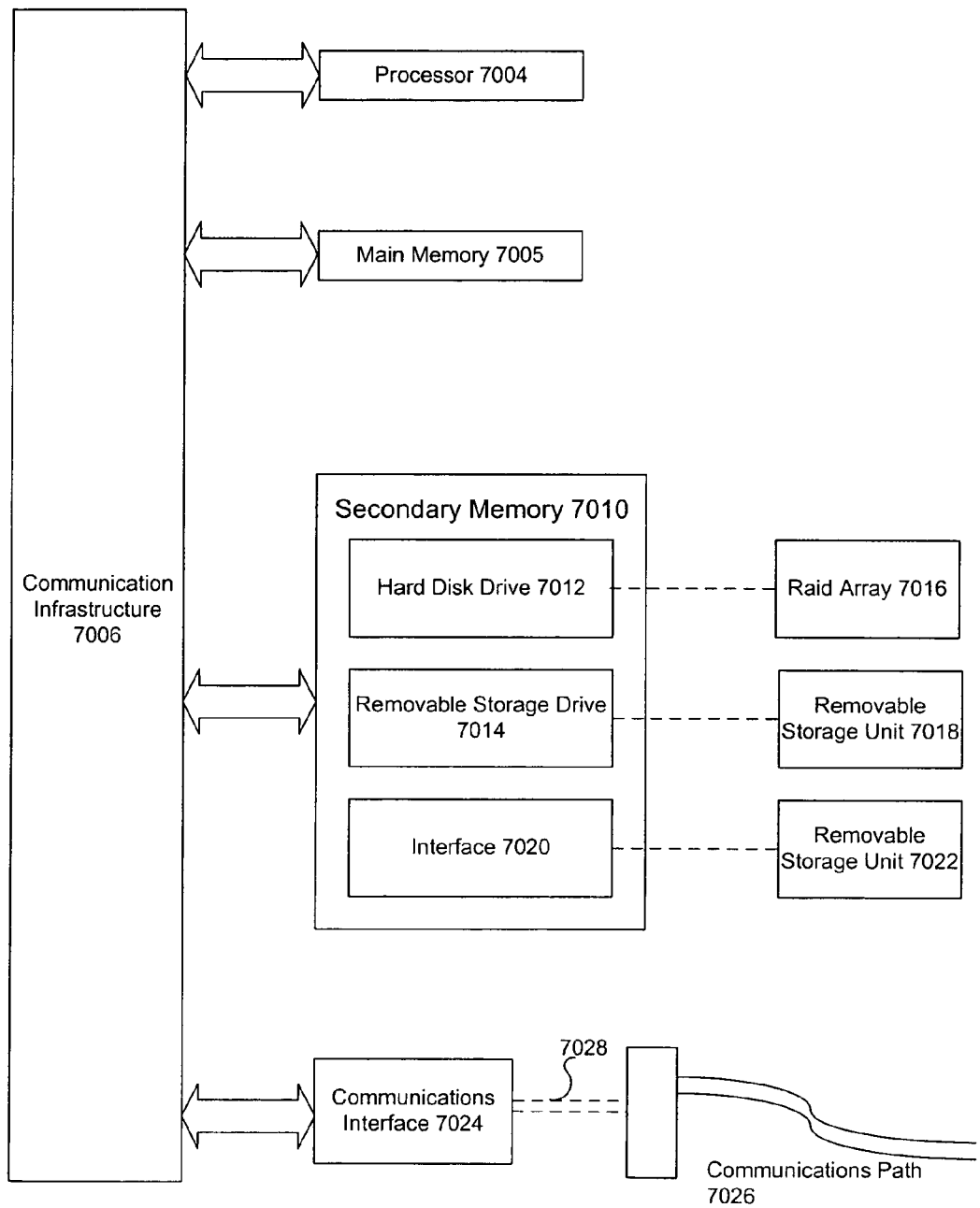
FIG. 7 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 7000 is shown in FIG. 7. The computer system 700 includes one or more processors, such as processor 7004. Processor 7004 can be a special purpose or a general purpose digital signal processor. The processor 7004 is connected to a communication infrastructure 7006 (for example, a bus or network). Various software implementations are described in terms of this exemplary computer system. After reading this description, it will become apparent to a person skilled in the relevant art how to implement the invention using other computer systems and/or computer architectures.

Computer system 7000 also includes a main memory 7005, preferably random access memory (RAM), and may also include a secondary memory 7010. The secondary memory 7010 may include, for example, a hard disk drive 7012, and/or a RAID array 7016, and/or a removable storage drive 7014, representing a floppy disk drive, a magnetic tape drive, an optical disk drive, etc. The removable storage drive 714 reads from and/or writes to a removable storage unit 7018 in a well known manner. Removable storage unit 7018, represents a floppy disk, magnetic tape, optical disk, etc. As will be appreciated, the removable storage unit 7018 includes a computer usable storage medium having stored therein computer software and/or data.

In alternative implementations, secondary memory 7010 may include other similar means for allowing computer programs or other instructions to be loaded into computer system 7000. Such means may include, for example, a removable storage unit 7022 and an interface 7020. Examples of such means may include a program cartridge and cartridge interface (such as that found in video game devices), a removable memory chip (such as an EPROM, or PROM) and associated socket, and other removable storage units 7022 and interfaces 7020 which allow software and data to be transferred from the removable storage unit 7022 to computer system 7000.

Computer system 7000 may also include a communications interface 7024. Communications interface 7024 allows software and data to be transferred between computer system 7000 and external devices. Examples of communications interface 7024 may include a modem, a network interface (such as an Ethernet card), a communications port, a PCM-CIA slot and card, etc. Software and data transferred via communications interface 7024 are in the form of signals 7028 which may be electronic, electromagnetic, optical or other signals capable of being received by communications interface 7024. These signals 7028 are provided to communications interface 7024 via a communications path 7026. Communications path 7026 carries signals 7028 and may be implemented using wire or cable, fiber optics, a phone line, a cellular phone link, an RF link and other communications channels.

The terms "computer program medium" and "computer usable medium" are used herein to generally refer to media such as removable storage drive 7014, a hard disk installed in hard disk drive 7012, and signals 7028. These computer program products are means for providing software to computer system 7000.

Computer programs (also called computer control logic) are stored in main memory 7008 and/or secondary memory 7010. Computer programs may also be received via communications interface 7024. Such computer programs, when executed, enable the computer system 7000 to implement the present invention as discussed herein. In particular, the computer programs, when executed, enable the processor 7004 to implement the processes of the present invention. Where the invention is implemented using software, the software may be stored in a computer program product and loaded into computer system 7000 using raid array 7016, removable storage drive 7014, hard drive 7012 or communications interface 7024.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

VI. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method to encode an image divided into macroblocks, each macroblock including a plurality of luma blocks and a plurality of chroma blocks, wherein each luma and chroma block includes an array of pixels, comprising:
   determining a maximum variance of luma blocks in a macroblock;
   determining if said macroblock is in correlation with at least one reference macroblock by computing a correlation between motion vectors of said macroblock and motion vectors of said at least one reference macroblock;
   quantizing said macroblock using a quantization level based on said maximum variance of said luma blocks and said correlation between said macroblock and said at least one reference macroblock, wherein said quantizing step includes setting a first quantization level for said macroblock if said maximum variance of said luma blocks is greater than a predetermined threshold and said macroblock is in correlation with at least one reference macroblock, and if each of a plurality of reference macroblocks has a maximum variance of its respective luma blocks greater than a predetermined threshold and is in correlation with its at least one respective reference macroblock, otherwise setting a second quantization level for said macroblock, wherein said second quantization level is greater than said first quantization level; and repeating said determining and quantizing steps for each macroblock in said image.

2. The method of claim 1, wherein a macroblock is in correlation with an reference macroblock if a horizontal motion vector of said macroblock is in correlation up to a predetermined threshold with a horizontal motion vector of said reference macroblock and if a vertical motion vector of said macroblock is zero.

3. The method of claim 1, wherein said image is one of a P-picture or a B-picture of an mpeg video stream.

4. The method of claim 1, wherein a reference macroblock is a macroblock prior to said macroblock and a number of reference macroblocks is at least three.

5. A method to encode an divided into macroblocks, each macroblock including a plurality of luma blocks and a plurality of chroma blocks wherein each luma and chroma block includes an array of pixels, comprising:

determining a maximum variance of luma blocks in a macroblock;

determining if said macroblock is in correlation with at least one reference macroblock by computing a correlation between motion vectors of said macroblock and motion vectors of said at least one reference macroblock;

quantizing said macroblock using a quantization level based on said maximum variance of said luma blocks and said correlation between said macroblock and said at least one reference macroblock, wherein said quantizing step includes setting a first quantization level for said macroblock if each of a plurality of reference macroblocks has a maximum variance of its respective luma blocks greater than a predetermined threshold and is in correlation with its at least one respective reference macroblock, otherwise setting a second quantization level for said macroblock wherein said second quantization level is greater than said first quantization level; and repeating the determining and quantizing steps for each macroblock in said image.

6. The method of claim 5, wherein said reference macroblocks are macroblocks prior to said macroblock and a number of reference macroblocks is at least three.

7. The method of claim 5, wherein a macroblock is in correlation with an reference macroblock if a horizontal motion vector of said macroblock is in correlation up to a predetermined threshold with a horizontal motion vector of said reference macroblock and if a vertical motion vector of said macroblock is zero.

8. A method to encode an image divided into macroblocks, each macroblock including a plurality of luma blocks and a plurality of chroma blocks, wherein each luma and chroma block includes an array of pixels, comprising:

determining a maximum variance of luma blocks in a macroblock;

determining if said macroblock is in correlation with at least one reference macroblock by computing a correlation between motion vectors of said macroblock and motion vectors of said at least one reference macroblock;

quantizing said macroblock using a quantization level based on said maximum variance of said luma blocks and said correlation between said macroblock and said at least one reference macroblock, wherein said quantizing step includes setting a first quantization level for said macroblock if said maximum variance of said luma blocks is greater than a predetermined threshold and said macroblock is in correlation with at least one reference macroblock and if each of a plurality of reference macroblocks has a maximum variance of its respective luma blocks greater than a predetermined threshold and is in correlation with its at least one respective reference macroblock and if said macroblock is not an edge macroblock, otherwise setting a second quantization level for said macroblock wherein said second quantization level is greater than said first quantization level; and repeating said determining and quantizing steps for each macroblock in said image.

9. The method of claim 8, wherein a reference macroblock is a macroblock prior to said macroblock and a number of reference macroblocks is at least three.

10. The method of claim 8, wherein a macroblock is in correlation with an reference macroblock if a horizontal motion vector of said macroblock is in correlation up to a predetermined threshold with a horizontal motion vector of said reference macroblock and if a vertical motion vector of said macroblock is zero.

11. A method to, encode an image divided into macroblocks, each macroblock including plurality of luma blocks and a plurality of chroma blocks, wherein each luma and chroma block includes, an array of pixels, comprising:

determining a maximum variance of luma blocks in a macroblock;

determining if said macroblock is in correlation with at least one reference macroblock by computing a correlation between, motion vectors of said macroblock and motion vectors of said at least one reference macroblock;

quantizing said macroblock using a quantization level based on said maximum variance of said luma blocks and said correlation between said macroblock and said at least one, reference macroblock, wherein said quantizing step includes setting a first quantization level for said macroblock if each of a plurality of reference macroblocks has a maximum variance of its respective luma blocks greater than a predetermined threshold and is in correlation with its at least one respective reference macroblock and if said macroblock is not an edge macroblock, otherwise setting a second quantization level for said macroblock wherein said second quantization level is greater than said first quantization level; and repeating said determining and quantizing steps for each macroblock in said image.

12. The method of claim 11, wherein a reference macroblock is a macroblock prior to said macroblock and a number of reference macroblocks is at least three.

13. The method of claim 11, wherein a macroblock is in correlation with an reference macroblock if a horizontal motion vector of said macroblock is in correlation up to a predetermined threshold with a horizontal motion vector of said reference macroblock and if a vertical motion vector of said macroblock is zero.

\* \* \* \* \*

UNITED STATES PATENT AND TRADEMARK OFFICE
CERTIFICATE OF CORRECTION

| | |
|---|---|
| PATENT NO. | : 8,064,516 B2 |
| APPLICATION NO. | : 11/159217 |
| DATED | : November 22, 2011 |
| INVENTOR(S) | : Kojokaro et al. |

It is certified that error appears in the above-identified patent and that said Letters Patent is hereby corrected as shown below:

Column 15
Line 12, please replace "with an reference" with --with a reference--.

Column 15
Line 22, please replace "encode an divided" with --encode an image divided--.

Column 15
Line 24, please replace "blocks wherein" with --blocks, wherein--.

Column 15
Line 50, please replace "with an reference" with --with a reference--.

Column 16
Line 23, please replace "with an reference" with --with a reference--.

Column 16
Line 28, please replace "to, encode" with --to encode--.

Column 16
Line 29, please replace "including plurality" with --including a plurality--.

Column 16
Line 31, please replace "includes, an array" with --includes an array--.

Column 16
Line 36, please replace "between, motion" with --between motion --.

Column 16
Line 42, please replace "one, reference" with --one reference--.

Signed and Sealed this
Sixth Day of March, 2012

David J. Kappos
*Director of the United States Patent and Trademark Office*

Column 16

Line 57, please replace "with an reference" with --with a reference--.